United States Patent [19]

Sullivan

[11] 4,426,481

[45] Jan. 17, 1984

[54] POLYMERIC MATRIX CONTAINING β-ELIMINATING POLYMER AND PROCESS FOR PREPARING SAME

[75] Inventor: Charles I. Sullivan, Melrose, Mass.

[73] Assignee: Polaroid Corporation, Cambridge, Mass.

[21] Appl. No.: 285,936

[22] Filed: Jul. 23, 1981

Related U.S. Application Data

[60] Division of Ser. No. 130,532, Mar. 14, 1980, Pat. No. 4,297,431, which is a continuation-in-part of Ser. No. 942,490, Sep. 15, 1978, abandoned, which is a continuation-in-part of Ser. No. 774,599, Mar. 4, 1977, abandoned, which is a continuation-in-part of Ser. No. 681,140, Apr. 28, 1976, abandoned, which is a continuation-in-part of Ser. No. 487,228, Jul. 10, 1974, abandoned.

[51] Int. Cl.$^3$ .......... C08F 2/16

[52] U.S. Cl. .......... 524/460; 525/291; 525/293; 525/295; 525/296; 525/300; 525/301; 525/302; 525/312

[58] Field of Search .......... 525/295, 291, 301, 293, 525/296, 300, 302, 312; 524/460

[56] References Cited

U.S. PATENT DOCUMENTS

| | | | |
|---|---|---|---|
| 3,345,163 | 10/1967 | Land et al. | 96/3 |
| 3,362,819 | 1/1968 | Land | 96/3 |
| 3,384,483 | 5/1968 | Becker | 96/29 |
| 3,421,892 | 1/1969 | Taylor | 96/3 |
| 3,615,422 | 10/1971 | Haberlin | 96/3 |
| 3,625,685 | 12/1971 | Avtges et al. | 96/3 |
| 3,709,690 | 1/1973 | Cohen et al. | 96/84 |
| 3,749,577 | 7/1973 | Hollister et al. | 96/114 |
| 3,772,025 | 11/1973 | Land | 96/29 |
| 4,038,082 | 7/1977 | Yoshida et al. | 96/77 |
| 4,120,727 | 10/1978 | Fitzgerald . | |
| 4,201,587 | 5/1980 | Bedell et al. | 430/224 |

OTHER PUBLICATIONS

"Elimination and Addition Reactor, Part XIX", J. Chem. Soc., B, 1970, p. 671, Crosby et al.

*Primary Examiner*—J. Ziegler
*Attorney, Agent, or Firm*—Louis G. Xiarhos

[57] ABSTRACT

A diffusion control layer comprising a polymerization product of a monomer capable of undergoing β-elimination in an alkaline environment is disclosed for use in diffusion transfer film units, as an interlayer or overcoat in photosensitive elements, or as a timing layer or overcoat in image-receiving elements.

6 Claims, 4 Drawing Figures

POLYMERIC MATRIX CONTAINING β-ELIMINATING POLYMER AND PROCESS FOR PREPARING SAME

CROSS REFERENCE TO RELATED PATENT APPLICATIONS

This application is a division of my earlier-filed and co-pending patent application, Ser. No. 130,532, filed Mar. 14, 1980, and issued Oct. 27, 1981 as U.S. Pat. No. 4,297,431, which is a continuation-in-part of now-abandoned U.S. application Ser. No. 942,490, filed Sept. 15, 1978, which in turn is a continuation-in-part of now-abandoned U.S. application Ser. No. 774,599, filed Mar. 4, 1977, which is in turn a continuation-in-part of now-abandoned U.S. application Ser. No. 681,140, filed Apr. 28, 1976, and which is in turn a continuation-in-part of now-abandoned U.S. application Ser. No. 487,228, filed July 10, 1974.

Various diffusion transfer systems have been disclosed in the art. Generally speaking, a transfer image is obtained by exposing a photosensitive element or negative component comprising at least one light sensitive silver halide layer to form a developable image; thereafter developing this image by applying an aqueous alkaline processing fluid, forming, as a function of this development, an imagewise distribution of soluble and diffusible image-forming material, which may be a dye, a dye intermediate or a soluble silver complex; and transferring this imagewise distribution, at least in part, by diffusion to a superposed image-receiving element or positive component including an image-receiving stratum to impart thereto a transfer image.

The dye image forming materials employed in such processes may generally be characterized as substances which are initially soluble or diffusible in the processing composition and then selectively rendered non-diffusible in an imagewise pattern as a function of development, or substances which are initially insoluble or non-diffusible in the processing composition and then selectively rendered diffusible in an imagewise pattern as a function of development. Numerous examples of both types of dye image-forming materials are recited in the patent literature. A particularly useful class of such materials are dye developers (dyes which are also silver halide developing agents) described in U.S. Pat. No. 2,983,606 and many other patents.

In any of these systems, multicolor images may be obtained by employing a photosensitive element or negative component with at least two selectively sensitized silver halide layers, each having associated therewith a dye image-forming material exhibiting the desired spectral absorption characteristics. The most commonly employed elements of this type are the so called tripack structures employing a blue-, a green- and a red-sensitive silver halide layer having associated therewith, respectively, a yellow, a magenta and a cyan dye image-providing material.

The negative and positive components in such a system may be separate elements which are brought into superposition during development and thereafter retained together or separated to provide the desired transfer image (e.g., as described in the aforementioned U.S. Pat. No. 2,983,606), or these two components may comprise a unitary structure, such as the so called integral negative-positive film units wherein the respective components are retained together prior to exposure and following image formation. In the latter system a reflecting material such as a white pigment, e.g., titanium dioxide, is provided between the two components. This may comprise a preformed layer or one formed during development which masks the negative component and provides the desired background for viewing the image formed in the positive component as a reflection print. The respective components in such integral film units may be contained on a single dimensionally stable layer or support, or they may be confined between a pair of such supports. Of course, any support associated with the positive component should be transparent to permit viewing of the transfer image.

As examples of such integral negative-positive film units for preparing color transfer images viewable without separation, mention may be made of those described in U.S. Pat. Nos. 3,415,644; 3,415,645; 3,415,646; 3,473,925; 3,550,515; 3,573,042; 3,573,043; 3,573,044; 3,576,625; 3,578,540; 3,589,904; 3,594,164; 3,594,165; 3,607,285; 3,615,421; 3,615,436; 3,615,539; 3,615,540; 3,619,192; 3,619,193; 3,621,768; 3,647,437; 3,652,281; 3,652,282; 3,672,890; 3,679,409; 3,689,262; 3,690,879; and others.

With multicolor diffusion transfer products such as those described above employing two or more sets of silver halide emulsion layers, each layer having its own dye image-forming material associated therewith, premature migration of the color-providing material during processing can produce undesirable inter-image effects wherein the dye or other color providing material is controlled at least in part by the "wrong" silver halide layer, i.e., a silver halide layer other than the one with which it was initially associated in the film unit.

This problem may be further illustrated by reference to a conventional tripack negative employing dye developers, wherein the negative is comprised of a support carrying a red-sensitive silver halide layer having a cyan dye developer associated therewith, a green-sensitive silver halide layer having a magenta dye developer associated therewith and a blue-sensitive silver halide layer having a yellow dye developer associated therewith. Ideally, solubilized dye developer should diffuse to its associated silver halide layer, and if not bound in that layer it diffuses further to the image receiving element. Diffusion through the silver halide layer is generally controlled by development of the silver halide layer. If the dye developer is permitted to migrate to other silver halide layers before its associated silver halide layer has been developed, the resultant transfer image will have something less than the desired color fidelity due to dye loss and/or transfer of the wrong dye.

To illustrate further, if it is possible for the magenta dye developer to back-diffuse to the red sensitive silver halide layer before development of this layer by the cyan dye developer, some of the magenta dye developer may develop silver halide in this "wrong" layer and be tied up or rendered nondiffusible. This will produce a loss of magenta dye, or so called "magenta drop off", in the transfer image. Moreover, development of the red-sensitive silver halide layer by magenta dye developer permits some of the cyan dye developer which should have instead been oxidized to diffuse to the image-receiving element, thereby resulting in unwanted cyan transfer.

To obviate or minimize these inter-image effects, layers comprised of various materials have been inserted between the emulsions and their individual supplies of dye image-forming material to prevent premature diffusion of the latter to an unassociated silver halide emulsion. Such an interlayer is permeable to the passage of processing composition so that development can take place in the emulsions on either side of the interlayer. The interlayer is impermeable for a short time to the dye image-forming material solubilized by the processing composition so that the emulsions will be substantially developed before the dye material associated with one emulsion layer can travel through the interlayer to another emulsion layer.

Control of the diffusion of color-providing substances by deferring or retarding their ability to diffuse to the image-receiving layer until after desired development has occurred is disclosed in U.S. Pat. No. 3,345,163 wherein said control is effected, e.g., by the use of a slowly hydrolyzable material as a barrier layer separating an outer emulsion and its associated color-providing substance from an inner emulsion and its associated color-providing substance.

Several other types of photosensitive element interlayer systems have been disclosed in the art. For example, as seen in U.S. Pat. No. 3,615,422 two emulsion layers may be separated by an interlayer comprised of metal-free polymeric material permeable to processing composition but impermeable to color providing substances until the polymer has become hydrated. The polymer's hydration rate is chosen so that the requisite hydration will occur subsequent to substantial development of the silver halide emulsion having the slowest development rate and prior to substantial fogging of the emulsion layer with the most rapid fogging rate. The interlayer can then retard both forward and rearward diffusion of color-providing substances or dyes. It retards rearward diffusion of dye associated with the next outer silver halide emulsion layer and forward diffusion of dye associated with the next inner silver halide emulsion layer. A variety of polymeric material found especially useful in this type of system is disclosed in U.S. Pat. No. 3,421,892 which relates to the use of polyvinyl amide interlayers. These interlayers function like molecular sieves whose interstices become so enlarged by hydration of the polymer that a molecule of dye or other color-providing substance can pass through.

The interlayer material disclosed in U.S. Pat. No. 3,384,483 is comprised of an alkali permeable, water insoluble polyvalent metal salt of a film forming, alkali permeable and water soluble polymer with free carboxylic acid groups. It appears that this polymeric salt, which is less permeable to dye developer in aqueous alkaline solution than the polymeric carboxylic acid used to prepare it, retards diffusion of dye developer to an unassociated emulsion layer during development via a cross-link mechanism, i.e., polyvalent metal moieties form the requisite alkali permeable, water insoluble salts by cross-linking with carboxylic acid moieties of the polymeric carboxylic acid. When this salt becomes hydrated during processing, it swells enough to permit diffusion of unoxidized dye developer through its interstices to the image receiving element.

Rather than employing an interlayer consisting essentially of only a single phase of material, an interlayer comprised of an admixture of materials may be utilized. Such a system is disclosed in U.S. Pat. No. 3,625,685, where silver halide strata are separated by interlayers containing two phases which are intimately admixed, the dye permeation-inducing component or discontinuous phase (comprised of processing composition permeable material) and a coalesced latex or continuous phase (comprised of the coalesced essence of an aqueous film-forming synthetic polymeric dispersion). In this system the dye permeation-inducing material, which may be permeable or impermeable to the processing composition and is impermeable to dye image forming material, forms a lattice structure with the coalesced latex which is permeable to processing composition. Upon contact with processing composition, the dye permeation-inducing material, which is preferably a polymer, becomes permeable to solubilized dye material, thereby making it possible for dye to pass through the interlayer.

In a preferred embodiment of the above described system, the interlayer is rendered permeable by hydration of the discontinuous phase. This phase expands when hydrated to create interstices in the interlayer's lattice structure of sufficient size to permit the passage of solubilized dye therethrough. The rate of hydration and swelling is usually chosen so as to block migration of the dye image forming material until development of all emulsion layers in the photosensitive element is substantially completed, although it can also be chosen so as to achieve layerwise development of the emulsions and diffusion of the dye image forming material. In the latter type of system, an interlayer between two emulsion layers would preferably prevent such dye diffusion until there had been substantial development of the outer (closer to the image-receiving element) emulsion layer.

As can be seen from the discussion above, polymers rendered permeable to the passage of solubilized dye image forming material by hydration may be used alone or in a mixture with other materials to form a barrier interlayer between two emulsions. It is believed that such an interlayer system can act as a selective barrier because of the large size of the dye (or dye precursor) molecules. While many of the molecules of processing composition e.g., water, alkali, etc., are small enough to slip through interstices in the interlayer lattice, those of the solubilized dye image forming material are too large to do so in the time span contemplated for photographic processing unless these interstices are expanded by hydration of the barrier polymer.

Although such polymers have proven to be useful in delaying the diffusion of dye image-forming material, it has been found that they sometimes permit premature diffusion. This is because polymer hydration and the resultant interlayer expansion generally begin as soon as the polymer is contacted with processing composition. Thus, some dye diffusion could occur before substantial development of the silver halide emulsion protected by the interlayer. Furthermore, these polymers tend to produce rather slow interlayer expansion. Instead of switching quickly from a very impermeable condition to a highly permeable one as would often be desired, interlayer permeability usually occurs more gradually, sometimes beginning too soon and taking too long.

U.S. Pat. No. 3,362,819 discloses image-receiving elements, particularly adapted for employment in the preceding diffusion transfer processes, which comprise a support layer possessing on one surface thereof, in sequence, a polymeric acid layer, preferably an inert timing or spacer layer, and an image-receiving layer adapted to provide a visible image upon transfer to said layer of diffusible dye image-forming substance.

As set forth in the last-mentioned patent, the polymeric acid layer comprises polymers which contain acid groups, such a carboxylic acid and sulfonic acid groups, which are capable of forming salts with alkali metals, such as sodium, potassium, etc., or with organic bases, particularly quaternary ammonium bases, such as tetramethyl ammonium hydroxide, or potentially acid-yielding groups, such as anhydrides or lactones, or other groups which are capable of reacting with bases to capture and retain them. The acid-reacting group is, of course, nondiffusible from the acid polymer layer. In the preferred embodiments disclosed, the acid polymer contains free carboxyl groups and the transfer processing composition employed contains a large concentration of sodium and/or potassium ions. The acid polymers stated to be most useful are characterized by containing free carboxyl groups, being insoluble in water in the free acid form, and by forming water-soluble sodium and/or potassium salts. One may also employ polymers containing carboxylic acid anhydride groups, at least some of which preferably have been converted to free carboxyl groups prior to imbibition. While the most readily available polymeric acids are derivatives of cellulose or of vinyl polymers, polymeric acids from other classes of polymers may be used. As examples of specific polymeric acids set forth in the application, mention may be made of dibasic acid half-ester derivatives of cellulose which derivatives contain free carboxyl groups, e.g., cellulose acetate hydrogen phthalate, cellulose acetate hydrogen glutarate, cellulose acetate hydrogen succinate, ethyl cellulose hydrogen succinate, ethyl cellulose acetate hydrogen succinate, cellulose acetate hydrogen succinate hydrogen phthalate; ether and ester derivatives of cellulose modified with sulfoanhydrides, e.g., with orthosulfobenzoic anhydride; polystyrene sulfonic acid; carboxylmethyl cellulose; polyvinyl hydrogen phthalate; polyvinyl acetate hydrogen phthalate; polyacrylic acid; acetals of polyvinyl alcohol with carboxy substituted aldehydes, e.g., o-, m-, or p-benzaldehyde carboxylic acid; partial esters of ethylene/maleic anhydride copolymers; partial esters of methylvinyl ester/maleic anhydride copolymers; etc.

The acid polymer layer is disclosed to contain at least sufficient acid groups to effect a reduction in the pH of the image layer from a pH of about 12 to 14 to a pH of at least 11, and preferably to a pH of about 5 to 8 after a predetermined period.

It is, of course, necessary that the action of the polymeric acid be so controlled as not to interfere with either development of the negative or transfer of image dye formers. For this reason, the pH of the image layer is kept at a level of pH 12 to 14 until the positive dye image has been formed, after which the pH is reduced very rapidly to the desired final pH.

In order to prevent premature pH reduction during transfer processing, as evidenced, for example, by an undesired reduction in positive image density, the acid groups are disclosed to be so distributed in the acid polymer layer that the rate of their availability to the alkali is controllable, e.g., as a function of the rate of swelling of the polymer layer which rate in turn has a direct relationship to the diffusion rate of the alkali ions. The desired distribution of the acid groups in the acid polymer layer may be effected by mixing the acid polymer with a polymer free of acid groups, or lower in concentration of acid groups, and compatible therewith, or by using only the acid polymer but selecting one having a relatively lower proportion of acid groups.

It is also disclosed that the layer containing the polymeric acid may contain a water insoluble polymer, such as, for example, a cellulose ester, which acts to control or modulate the rate at which the alkali salt of the polymer acid is formed. As examples of cellulose esters contemplated for use, mention is made of cellulose acetate, cellulose acetate butyrate, etc. The particular polymers and combination of polymers employed in any given embodiment are, of course, selected so as to have adequate wet and dry strength and when necessary or desirable, suitable subcoats may be employed to help the various polymeric layers adhere to each other during storage and use.

The inert spacer layer of the aforementioned patent, for example, an inert spacer layer comprising polyvinyl alcohol or gelatin, acts to "time" control the pH reduction by the polymeric acid layer. This timing is disclosed to be a function of the rate at which the alkali diffuses through the inert spacer layer.

As examples of materials for use as dye image-receiving layers, mention may be made of solution dyeable polymers such as partially hydrolyzed polyvinyl acetate; polyvinyl alcohol with or without plasticizers; gelatin; polyvinyl alcohol or gelatin containing a dye mordant such as poly-4-vinylpyridine; and other materials known in the art.

The use of diffusion control layers in silver transfer processes, such as timing layers to control a neutralizing layer, is known in the art; see, for example, U.S. Pat. No. 3,772,025, issued Nov. 23, 1973, to Edwin H. Land, which disclosure is hereby incorporated herein by reference.

As disclosed in the previously cited patents, the liquid processing composition referred to for effecting diffusion transfer processes comprises at least an aqueous solution of an alkaline material, for example, sodium hydroxide, potassium hydroxide, and the like, and preferably possessing a pH in excess of 12. Where this liquid processing composition is to be applied to the photosensitive emulsion stratum by being spread thereon, preferably in a relatively thin and uniform layer intermediate that stratum and a superposed image-receiving layer, it is disclosed to include a viscosity-increasing compound constituting a film-forming material of the type which, when the composition is spread and dried, forms a relatively firm and relatively stable film. The preferred film-forming materials disclosed comprise high molecular weight polymers such as polymeric, water-soluble ethers which are inert to an alkaline solution such as, for example, hydroxyethyl cellulose, hydroxyethyl carboxymethyl cellulose or sodium carboxymethyl cellulose. Other film-forming materials or thickening agents whose ability to increase viscosity is substantially unaffected if left in alkaline solution for a long period of time also are capable of utilization. As stated, the film-forming material is preferably contained in the processing composition in such suitable quantities as to impart to the composition a viscosity in excess of 100 cps. at a temperature of approximately 24° C. and preferably in the order of 100,000 cps. to 200,000 cps. at that temperature.

It is a primary object of the present invention to provide novel diffusion control layers for use in photographic diffusion transfer products and processes, said diffusion control layers controlling the diffusion transfer of a reagent to or through a layer of a photosensitive component or a positive component of a diffusion transfer film unit.

A further object of the present invention is to provide products for use in photographic diffusion transfer color processes which include a photosensitive element interlayer which substantially prevents diffusion of solubilized dye image-forming material through said interlayer until after a predetermined period.

Another object of this invention is to provide such an interlayer which rapidly switches from a condition of substantial impermeability to solubilized dye image-forming material to one of substantial permeability to such material.

Still another object is to provide such an interlayer of a polymer which is initially impermeable to solubilized dye image-forming material, which interlayer becomes permeable to such solubilized dye image-forming material following a predetermined, short time period after said interlayer has been contacted with an alkaline processing composition, which composition solubilizes and transports said dye image-forming material through the interlayer.

A still further object of the present invention is to provide products for use in photographic diffusion transfer processes which include a neutralizing system for lowering the pH of an aqueous alkaline processing fluid, said neutralizing system including a neutralizing layer and a timing layer so disposed with respect to the neutralizing layer that said processing fluid must first diffuse through the timing layer before contacting said neutralizing layer, said timing layer being capable of rapidly switching from a condition of substantial impermeability to alkali to a condition of substantial permeability thereto.

A still further object is to provide a polymeric overcoat for an image-receiving element which rapidly switches from a condition of substantial impermeability to processing fluid to one of substantial permeability to such material.

Other objects of the invention will in part be obvious and will in part appear hereinafter.

The invention accordingly comprises the products possessing the features, properties and the relation of components which are exemplified in the following detailed disclosure, and the scope of the application of which will be indicated in the claims.

Figure 1:
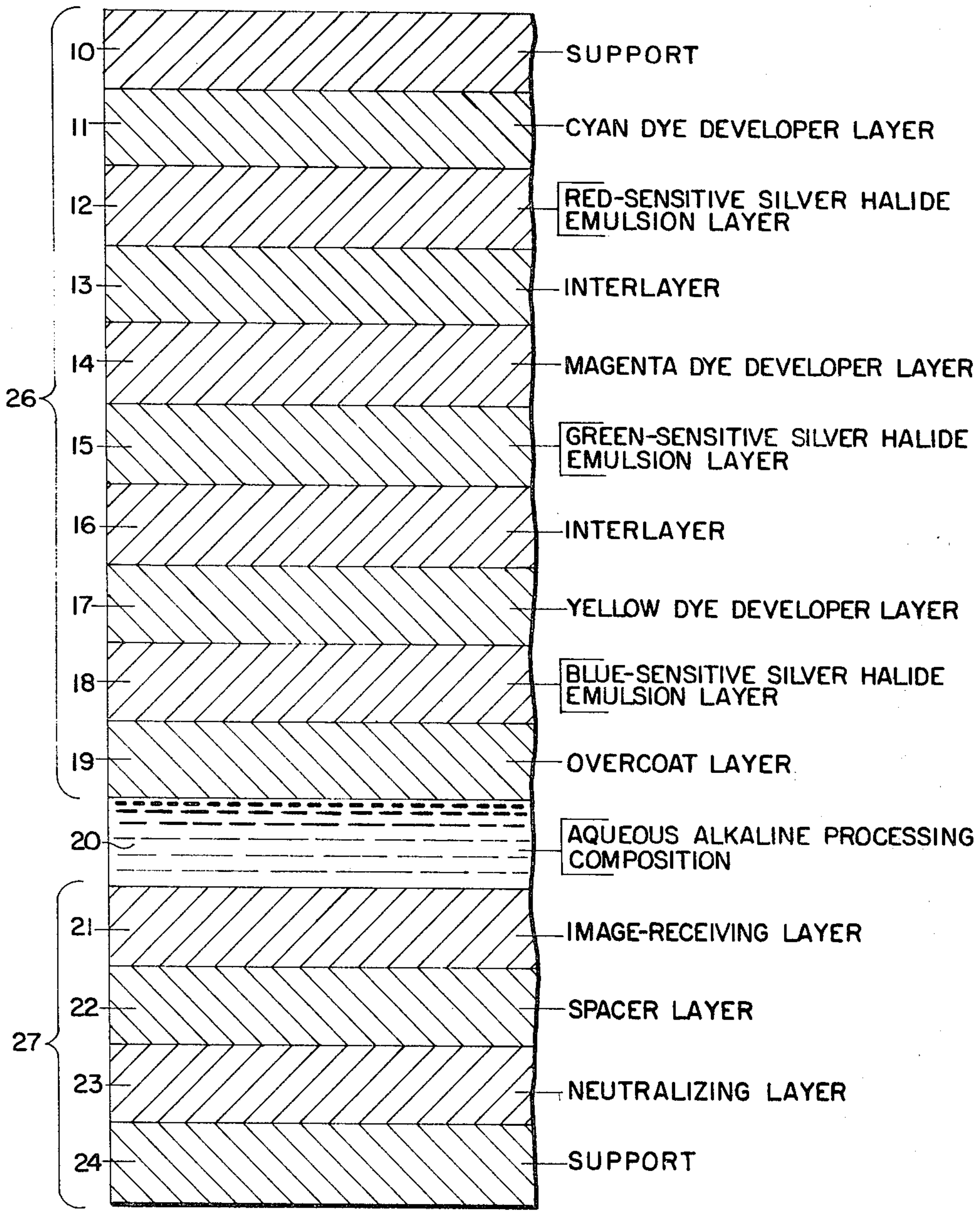
FIG. 1 is a cross-sectional view of a photographic film unit including diffusion control layers of this invention.

It has been found that polymerization products of monomers capable of undergoing $\beta$-elimination in an alkaline environment are useful for providing timed diffusion control in diffusion transfer photographic film units. Diffusion control layers of these polymerization products may be formulated for use as diffusion control interlayers or overcoats in photosensitive elements, and as diffusion control, e.g., timing layers or overcoats in image-receiving elements. These polymeric materials must undergo $\beta$-elimination before substantial swelling occurs, $\beta$-elimination and swelling being a prerequisite to permeation by selected materials, e.g., an image-forming material such as a dye, dye intermediate or soluble silver complex, soluble in or solubilized by an aqueous alkaline processing fluid.

The $\beta$-elimination step which the polymeric materials of the diffusion control layers of this invention undergo ensures that there is a delay in permeability after contact of the diffusion control layer with the processing composition, and provides a "hold" of the alkali or soluble or solubilized material followed by a rapid "release" or opening to permit the soluble or solubilized material to pass. The polymeric materials may be thought of as "hold-release" polymers which delay diffusion therethrough of alkali or material soluble in or solubilized by processing fluid by a predetermined time, e.g., from less than five seconds to more several hundred seconds.

The diffusion control layers of this invention comprise a polymerization product of a monomer capable of undergoing $\beta$-elimination in an alkaline environment, said polymerization product comprising recurring units of the formula

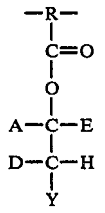

wherein

R is the addition polymerization product of an ethylenically unsaturated alkyl group of two or three carbon atoms;

A, D and E are selected from the group consisting of hydrogen, methyl and phenyl provided that no more than one of A, E, or D may be methyl or phenyl; and Y is an activating group.

The diffusion control layers of this invention may be used as interlayers between silver halide emulsion layers sensitized to different regions of the spectrum, each emulsion having an associated dye image-forming material. They may be utilized, e.g., in the manner described in aforementioned U.S. Pat. Nos. 3,615,422 and 3,421,892, substituting the hold-release polymers of this invention for the interlayer polymer compositions disclosed therein.

The time for $\beta$-elimination to occur subsequent to contact with processing composition and for subsequent hydration should be sufficient to maintain the interlayer substantially impermeable to solubilized dye image-forming material until there has been at least substantial development of the emulsions between the interlayer and the image-receiving layer but before there has been substantial fogging of the emulsion layer with the most rapid fogging rate.

The diffusion control layers of this invention may be used as timing or spacer layers employed between the alkaline processing composition introduced into the film unit and a neutralizing layer, e.g., a polymeric acid layer, to control the initiation of pH reduction by acting as a substantially impermeable barrier to the alkaline processing composition until $\beta$-elimination occurs.

The diffusion control layers of the invention can also be utilized as an overcoat layer, such as overcoat layer 19 shown in FIG. 1. The employment of such an overcoat layer can be utilized to control, for example, desired dye transfer by conversion of a substantially dye-impermeable layer to a substantially dye-permeable layer.

Figure 3:
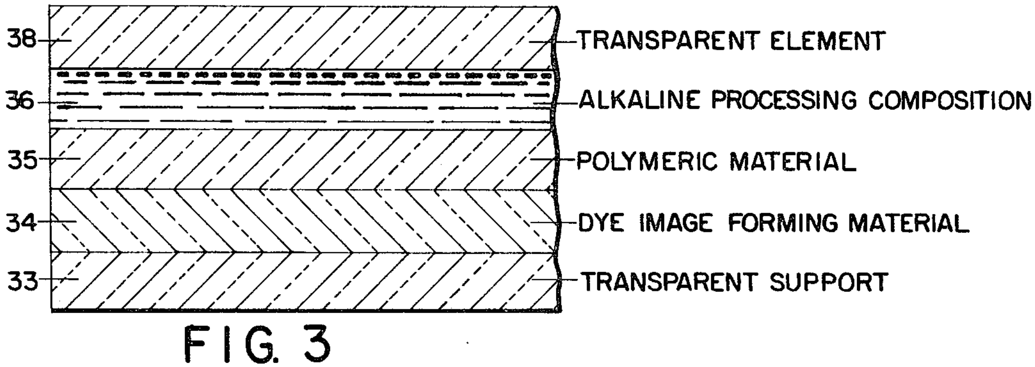
FIG. 3 illustrates a model arrangement for measuring the "hold-time" of the interlayers of this invention.

The introduction of double bonds into a molecule containing single bonds involves the elimination of atoms or groups from adjacent atoms. When elimination reactions involve β-substituted esters, acids, ketones, aldehydes and nitro compounds, they are called β-eliminations. According to Hendrickson, Cram and Hammond, Organic Chemistry (3rd Edition, McGraw-Hill Book Company, 1970), the electron-withdrawing groups have strong acid-strengthening effects on the α-proton which is removed by base during the reaction. This 1,2-elimination under basic conditions is very familiar as shown by FIG. 14-3 from Hendrickson, Cram and Hammond which follows.

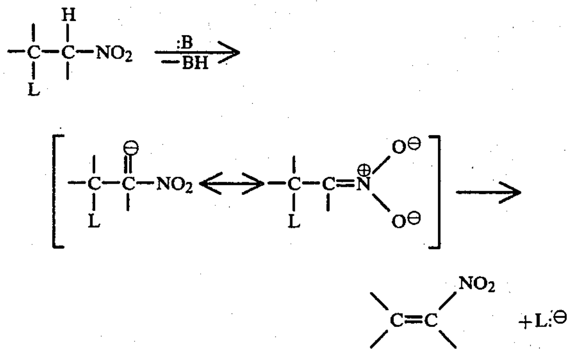

where L is a leaving group, B is a base and $-NO_2$ a typical activating group. In general terms this might be written:

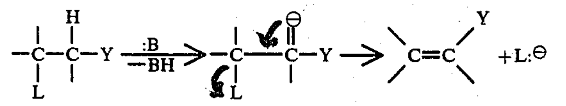

where Y is an activating group.

Substituents which activate β-elimination under basic conditions are known. The nature of the activation in β-eliminations was studied by J. Crosby and C. J. M. Stirling in J. Chem. Soc. (B) 1970 page 671. It was concluded that resonance stabilization of a carbanionic species was an important component of activation.

It has been discovered that such a β-substituted compound may be incorporated into a polymer to provide a polymer which is substantially impermeable to alkali or certain materials which are soluble in or solubilized by alkaline processing fluid until after β-elimination breaks bonds liberating groups capable of absorbing water, swelling and causing the polymer to become permeable to these soluble or solubilized materials and that such polymer may be used as a diffusion control layer, the resulting predetermined time delay preventing premature diffusion of the alkali or soluble or solubilized materials. By controlling the mole proportion or ratio of such β-elimination moieties in the polymer, as well as the thickness of the polymeric layer, one may provide a predetermined permeability time desired for the particular diffusion transfer system.

With reference to the above general formulation for β-elimination, the leaving group, L, is the polymeric structure from which a β-substituted material is eliminated or such a polymer additionally containing grafted moieties as disclosed and claimed in copending application Ser. No. 942,489, in the names of Bedell, Sullivan and Taylor.

The β-elimination reaction can then be written either

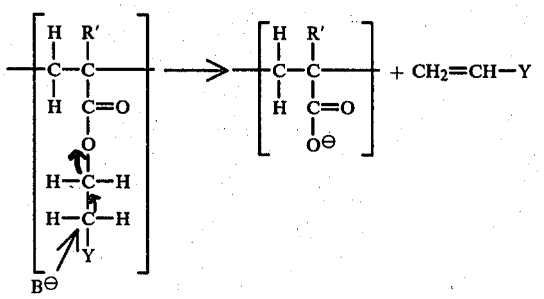

where L is 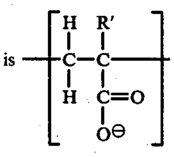 and

R' is the hydrogen or methyl and Y is selected from the group consisting of $-SO_2W$,

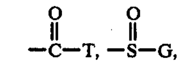

and $-CN$ where W is $-C_6H_5CH_3$, $-CH_3$, $-OC_2H_5$, $-C_6H_5$, $-NR_2-N(CH_2C_6H_5)_2$; T is $-OC_2H_5$, $-CH_3$, $-H$, $-NH_2$, $-NR_2$; G is phenyl, methyl or ethyl and R is alkyl, e.g., methyl or ethyl; or

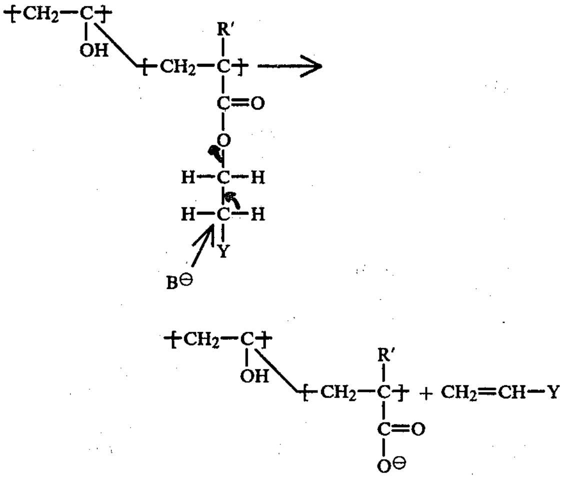

where L is 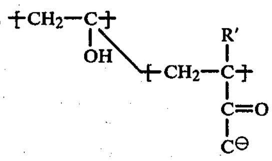

and R' and Y are as defined above.

More generally, the reaction is:

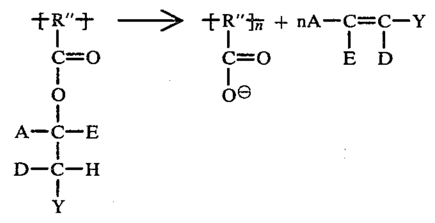

wherein R'' is the addition polymerization unit of an ethylenically unsaturated alkyl group of two or three carbon atoms, including a graft of such an ethylenically unsaturated alkyl group onto a polymeric organic backbone, A, E and D are selected from the group consisting of hydrogen, methyl and phenyl provided that no more than one of A, E or D may be methyl or phenyl, Y is an activating group as defined above. Typical monomers which have demonstrated that they provide to their polymerization product a β-elimination activating group include 2-cyanoethyl acrylate, 2-cyanoethyl methacrylate, and 2-carbethoxy-ethyl methacrylate. Other monomers which should provide the same functionality to their polymerization products include, for example, 2-p-toluenesulfonyl-ethyl acrylate and 2-methane sulfonylethyl acrylate.

The reaction using the polymerization product of 2-cyanoethyl acrylate can be visualized thusly;

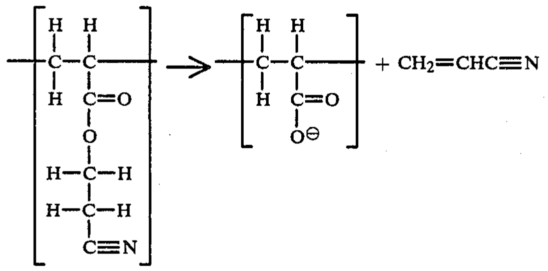

The polymeric diffusion control layers of the present invention can be effectively utilized as a means for controlling the diffusion therethrough of alkali or of certain materials soluble in or solubilized by an aqueous alkaline processing composition. Depending upon a desired photographic application and the nature of particular photographic materials or agents utilized, the diffusion characteristics of which are desirably controlled in predetermined manner, the permeability characteristics of a diffusion control layer of the invention can be adapted to suit such particular applications and utilizations. For example, a diffusion control layer of the invention, based upon a polymer comprising a β-substituted material capable of undergoing a β-elimination reaction in an alkaline environment and of providing increased permeability of the layer, can be utilized as an interlayer in a photographic film unit.

In accordance with a preferred mode of operation of an interlayer in a photosensitive element comprising at least two silver halide emulsion layers having associated image-providing material, the interlayer will be permeable to alkali, e.g., aqueous alkaline processing composition, but substantially impermeable to image-providing material until the β-elimination reaction and the resulting increase in permeability of the interlayer to such image-providing material. The utilization in a photosensitive element or film unit of an interlayer permeable to the alkali and certain other components of an aqueous alkaline processing composition, thus, permits the passage of alkali through the interlayer so as to effect initiation and substantial completion of development of silver halide emulsion layers while effectively preventing the permeation therethrough of image-providing material until the occurrence of a β-elimination reaction initiated by the alkaline environment and the resulting change in permeability of the interlayer to the passage of the image-providing material.

It will be appreciated that the molecular size of an image-providing material such as an image dye-providing material, a dye developer, dye intermediate or soluble silver complex, is large relative to the considerably smaller molecular size or configuration of alkaline materials such as sodium or potassium hydroxide or the like customarily employed in an aqueous alkaline processing composition. Accordingly, an interlayer which is permeable to the passage of alkali therethrough so as to permit development in emulsion layers on either side of the interlayer, but which is substantially impermeable for a short and predetermined time to an image dye-providing material soluble in or solubilized by an alkaline processing composition, makes possible substantial development before an image dye-providing material associated with one emulsion layer can permeate through the interlayer to another emulsion layer. The utilization of an interlayer capable of permitting the passage of alkali for development of emulsion layers while providing a predetermined "hold" of image dye-providing material until the occurrence of a β-eliminating reaction and the "release" or opening of the interlayer to the passage of the image dye-providing material constitutes an effective utilization of a diffusion control layer of the invention in a photographic photosensitive element or film unit and a means by which inter-image effects and associated dye loss and deficiencies in color fidelity may be mitigated or obviated.

A preferred interlayer will function in accordance with the mode previously described, whereby alkali will be permitted to permeate through the interlayer while image dye-providing material is effectively "held" until a subsequent β-elimination and "release". Alternatively, a diffusion control layer of the invention can comprise a polymeric interlayer adapted to be impermeable to the alkali of an aqueous alkali processing composition until the occurrence of a β-elimination reaction and the opening of the layer to the passage of such alkali. In a photosensitive element or film unit containing an interlayer operating in accordance with such mode, layerwise development and diffusion of image dye-providing material can be realized. Thus, an interlayer between two emulsion layers can be utilized to prevent development and diffusion of image dye-providing material until substantial development of the outer (closer to the image-receiving element) emulsion layer. In this connection, referring to FIG. 1, it will be seen that in such a system, development of emulsion layer 18 and diffusion of dye developer 17 would occur before the development of emulsion layer 15 and diffusion of dye developer 14. Similarly, owing to impermeability of interlayer 13 to alkali (in such a system), development and diffusion, respectively of emulsion layer 15 and dye developer 14 would be substantially complete before development of emulsion layer 12 and diffusion of dye developer material 11. Inasmuch as a layerwise development/diffusion process based upon an alkali-impermeable interlayer would not offer the advantage of as rapid image formation as can be realized from the utilization of an interlayer permeable to alkali but substantially impermeable to dye image-forming material, the utilization of interlayers functioning in accordance with the latter mode of operation will be decidedly preferred.

The diffusion control layers of the invention can comprise homopolymers or copolymers, including graft copolymers as mentioned hereinbefore. Mixtures of polymers can also be employed. Suitable copolymers for use as diffusion control layers will include, in addition to the β-eliminating component, units from comonomeric materials which provide the polymers with certain desired properties. Such materials may, for example, modulate coalescence or viscosity, improve film integrity and coatability, or provide for more even fluid permeation and ion penetration. For example, butyl acrylate is useful in providing hydrophobic balance and control to the dye permeation rate. Comonomers which are non-hydrolyzable or cross-linking may be used. Acrylic acid, methacrylic acid, 2-sulfoethyl methacrylate and 2-acrylamido-2-methylpropane sulfonic acid have been found useful comonomers in assuring that all parts of the diffusion control layer allow processing composition to pass through at essentially the same time and rate so as to promote uniform β-elimination and hydration of the permeation-inducing component. Ethylene glycol dimethacrylate, a cross-linking monomer, for example, is useful in the diffusion control layer used an an interlayer to modulate dye transfer rate after the initial hold.

The particular nature of the polymeric materials utilized in the formation of a diffusion control layer as described herein can vary widely depending upon the predetermined permeability characteristics desired in the diffusion control layer, and particularly, upon the functional mode by which the diffusion control layer provides its desired control of diffusion in a photographic product or process. As has been indicted hereinbefore, the β-elimination polymers of the diffusion control layers hereof undergo a β-elimination reaction which ensures that the diffusion of a material intended to be subject to the control of a diffusion control layer is "held" in place for a predetermined period of time and then "released" over a relatively short time period. The polymeric diffusion control layer undergoes a relatively rapid increase in hydrophilicity and water swellability and, thus, becomes more permeable to permit passage of the material which otherwise would not permeate the diffusion control layer. Depending upon the nature of materials desireably controlled through the utilization of a diffusion control layer and the desired functional mode of the diffusion control layer, the nature and permeability characteristics of a diffusion control layer and β-elimination materials thereof can be varied to suit particular applications. Thus, the permeability characteristics of a diffusion control layer can be adapted to permit the passage of alkali and other components of an alkaline processing composition (so as to permit development of emulsion layers in a photographic film unit) while being substantially impermeable to image dye-providing material until the occurrence of a β-elimination reaction. Such predetermined permeability characteristics are especially desired in an interlayer or overcoat material as described herein and can be embodied in a diffusion control layer to suit such applications. Alternatively, a diffusion control layer of the invention can be adapted to prevent the passage, or effect a "hold", of alkali for a predetermined period until the occurrence of a β-elimination reaction. Such predetermined permeability characteristic is especially desired in a timing or spacer layer, as described herein for control of environmental pH conditions in a photographic film unit, and can be suitably embodied in a diffusion control layer adapted to function in accordance with this desired mode.

The permeability characteristics of a diffusion control layer of the invention can be controlled in a predetermined manner, for example, by varying the relative hydrophilicity of the layer, as by incorporating a comonomer or mixture of comonomers into a β-elimination polymer, by varying the thickness of the diffusion control layer, by appropriate utilization of β-elimination materials varying in the nature of their activating groups and reactivity, by the control of the mole ratio of proportion of β-elimination units in a polymeric β-elimination material, or by the utilization of additional materials, such as polymeric materials, in the diffusion control layer to control the permeation of the layer by alkali or aqueous alkaline processing composition or materials soluble in or solubilized by alkaline processing composition. Where, for example, a diffusion control layer is adapted to utilization as a timing layer in a photographic film unit for control of environmental pH, a diffusion control layer exhibiting substantial impermeability to alkali, or providing a "hold" of alkali, can be provided by appropriate control of the hydrophobicity of the layer. In general, the more hydrophobic a polymeric layer, the slower will be the rate of permeation of alkali into the layer to initiate the β-elimination reaction and, accordingly, the longer the "hold" time.

Examples of polymeric materials exhibiting a "hold" of alkali and adapted to the provision of diffusion control layers which can be utilized as timing layers are the following:

1. a polymeric material comprised of 100 parts of a matrix copolymer (comprising 87.5 parts diacetone acrylamide, 2 parts acrylic acid and 0.5 part 2-acrylamido-2-methyl propane sulfonic acid, sodium salt; and 49 parts of β-elimination polymer, 2-cyaneothyl acrylate (all parts by weight);

2. a 59/40/1 interpolymer of diacetone acrylamide/2-cyanoethyl acrylate/acrylic acid.

The permeability characteristics of a diffusion control layer of the invention can be adapted to provide permeability to alkali, water and certain other components of an aqueous alkaline processing composition, while being substantially impermeable to materials soluble in or solubilized by alkaline processing composition until the occurrence of a β-elimination reaction as described hereinbefore. Selective permeability characteristics can, thus, be imparted and effectively utilized in applications, e.g., interlayers or overcoats in photographic elements or film units, where such permeability characteristics are desired. In general, the introduction of appropriate comonomeric materials, in the preparation of a β-elimination polymer, can be utilized to impart a level of hydrophilicity tending to promote the permeation of the polymeric material by alkaline processing composition. By the appropriate balancing of hydrophobic and hydrophilic comonomers in the production of a diffusion control layer, selective permeability characteristics can be obtained to provide desired functionality. Examples of polymeric materials which are permeable to alkali, while exhibiting substantial impermeability to dye image-forming material include the following:

1. a 47.5/50/2.5 interpolymer of diacetone acrylamide/2-cyanoethyl acrylate/acrylic acid (all parts by weight);

2. an 85/10/2/3 interpolymer of butylacrylate/2-cyanoethyl acrylate/methacrylic acid/2-acrylamido-2-methyl propane sulfonic acid (all parts by weight); and 3. a 63/35/2 interpolymer of diacetone acrylamide/2-cyanoethyl methacrylate/acrylic acid (all parts by weight).

The permeability characteristics of a diffusion control layer of the invention can be adapted to suit particular applications as set forth hereinbefore. While permeability characteristics can be controlled by utilizing appropriate comonomers in the polymerization of a $\beta$-elimination monomer, such control can also be realized through the addition to a $\beta$-elimination polymer of additional materials, usually polymeric materials, which modulate or alter the permeability of the diffusion control layer to alkali or certain materials soluble in or solubilized by alkaline processing composition. Such additional materials can be effectively utilized as a means of providing a diffusion control layer with a desired and predetermined "hold" time with respect to alkali or materials soluble in or solubilized by alkaline processing composition. Depending upon the permeability characteristics of such additional materials, as influenced by hydrophobic/hydrophilic balance or degree of coalescence, a diffusion control layer of the invention can be adapted to function in accordance with a predetermined mode.

Suitable polymeric materials for utilization in a diffusion control layer in combination with a polymeric $\beta$-elimination polymer comprise matrix polymers which provide a matrix or vehicle for the $\beta$-elimination polymer and which, depending upon permeability characteristics, can contribute to desired and predetermined permeability characteristics of a diffusion control layer.

The nature of a matrix polymer utilized in a diffusion control layer will depend upon the particular and predetermined utilization of the diffusion control layer. For example, utilization of a relatively hydrophobic matrix polymer in a diffusion control layer can provide substantial impermeability of the layer to alkali (until the occurrence of a $\beta$-elimination reaction) and can, thus, provide functionality adapted to utilization as a timing layer in a photographic product or as an overcoat layer in an image-receiving element thereof. Alternatively, the utilization of a relatively hydrophilic matrix polymer is especially suited to applications where a diffusion control layer is desirably permeable to alkali while remaining impermeable to materials soluble in or solubilized by aqueous alkaline processing composition, e.g., image dye-providing materials, until the occurrence of a $\beta$-elimination reaction. Such matrix materials will be especially suited to application in a diffusion control layer adapted to utilization as an interlayer or overcoat of a photographic diffusion transfer film unit.

Polymers suited as matrix polymers in diffusion control layers of the invention will, in general, comprise monomeric units such as acrylic acid; methacrylic acid; methyl methacrylate; 2-acrylamido-2-methylpropane sulfonic acid; acrylamide; methacrylamide; N,N-dimethylacrylamide; ethylacrylate; butylacrylate; diacetone acrylamide; acrylamido acetamide; and methacrylamido acetamide. Monomeric units, as well as relative proportions thereof, should be chosen on the basis of the physical characteristics desired in the matrix polymer and in the diffusion control layer in which it is to be utilized. For example, a more hydrophilic and, thus, a generally more permeable matrix material can be obtained by increasing the respective ratio of hydrophilic comonomers, such as acrylic acid or methacrylic acid, within a matrix polymer.

A polymeric matrix material can be combined with a $\beta$-elimination polymer in a number of ways to provide a matrix/$\beta$-elimination system adapted to utilization in a diffusion control layer. For example, a matrix polymer can be admixed with a suitable $\beta$-elimination polymer; by preparation of the matrix polymer in the presence of a $\beta$-elimination polymer; or by preparation of the $\beta$-elimination polymer in the presence of the matrix polymer.

A preferred matrix/$\beta$-elimination polymer system comprises the system whereby a $\beta$-elimination polymer is formed in the presence of a preformed matrix polymer. Such a system can be prepared by first polymerizing the comonomeric compounds comprising the matrix polymer and, upon substantial completion of such polymerization, introducing a $\beta$-elimination monomer (and any other ethylenically-unsaturated comonomeric compounds as may be included) and conducting the polymerization of the $\beta$-elimination monomer (or copolymer) in the presence of such performed matrix polymer. It has been found, for example, that matrix/$\beta$-elimination polymer materials as aforedescribed are especially advantageous from the standpoint of utilization in a diffusion control layer adapted to function as an interlayer in a photosensitive element of product.

Examples of matrix/$\beta$-elimination polymer systems suited to application as diffusion control layers of the invention include:

1. a polymeric material comprised of 100 parts of a matrix copolymer (comprising 87.5 parts diacetone acrylamide, 2 parts acrylic acid and 0.5 part 2-acrylamido-2-methyl propane sulfonic acid, sodium salt; and 49 parts of $\beta$-elimination polymer, 2-cyanoethyl acrylate (all parts by weight);

2. a polymer comprised of 100 parts of a matrix copolymer (comprising 95.5 parts diacetone acrylamide and 4.5 parts acrylic acid); and 100 parts of $\beta$-elimination polymer, 2-cyanoethyl acrylate (all parts by weight); and 3. a polymer comprised of 65 parts of a matrix copolymer (comprising 95.5 parts diacetone acrylamide and 4.5 parts acrylic acid); and 35 parts of a $\beta$-eliminating polymer, 2-cyanoethyl acrylate (all parts by weight).

Especially preferred from the standpoint of providing an interlayer exhibiting predetermined and desired "hold-release" properties is, for example, a polymeric material comprised of 70 parts of a matrix copolymer (comprising 50.5 parts diacetone acrylamide, 44 parts butyl acrylate, 5 parts acrylic acid and 0.5 parts 2-acrylamido-2-methylpropane sulfonic acid) and 30 parts of a $\beta$-elimination copolymer (comprising 72 parts 2-cyanoethyl acrylate and 28 parts diacetone acrylamide), all parts by weight. Such polymeric material has been found especially useful in providing a predetermined and desired "hold" of image dye-providing material (until occurrence of a $\beta$-elimination reaction) and, thereafter, a rapid "release" of such image dye-providing material.

The diffusion control layers of the invention comprising a $\beta$-elimination material can be variously used in photographic products and processes depending upon the predetermined permeability characteristics of such layers. The permeability properties of such layers can be readily evaluated by resort to methods described in greater detail hereinafter.

As shown in FIG. 1, the diffusion control layers of this invention may be employed in a photographic film unit having a photosensitive element 26 and an image-receiving element 27. Interlayers 13 and 16 are positioned between red- and green-, and blue- and green-sensitive silver halide emulsions, respectively, in the photosensitive element. These interlayers and the emulsions with their associated dye image-forming material, e.g., dye developer, are preferably arranged on a support 10 in the following order from that support: cyan dye developer layer 11, red-sensitive silver halide emulsion layer 12, interlayer 13, magenta dye developer layer 14, green-sensitive silver halide emulsion 15, interlayer 16, yellow dye developer layer 17 and blue-sensitive silver halide emulsion layer 18. An overcoat layer 19 may be coated on top of the blue-sensitive silver halide emulsion layer.

The image-receiving element 27 illustrated in FIG. 1 comprises in order, an image-receiving layer 21, a spacer or timing layer 22, a neutralizing layer 23 and a support layer 24. During processing the image-receiving layer is situated closest to the photosensitive element.

After the photosensitive element has been exposed, aqueous alkaline processing composition 20 is introduced between the photosensitive and image-receiving elements and permeates the emulsion layers to initiate development of the latent image carried therein and provide a medium for dye diffusion transfer to the image-receiving element. Dye image-forming materials associated with unexposed portions of the emulsion layers diffuse to the image-receiving element in known manner. As set forth in U.S. Pat. No. 3,362,819, situated beneath the image-receiving layer is a neutralizing layer containing a polymeric acid to neutralize alkali in the processing composition after a predetermined period.

The timing or spacing layer, comprised of polymeric material and located between the image-receiving and neutralizing layers is used to control the pH reduction. Diffusion control layers comprising a $\beta$-elimination polymeric material in accordance with this invention comprise, in one preferred embodiment, interlayers 13 and/or 16. Alternatively, overcoat layer 19 can comprise a diffusion control layer of a $\beta$-eliminating polymeric material. In another preferred embodiment the spacer layer 22 comprises a diffusion control layer of the invention. If desired, neutralizing layer 23 and spacer layer 22 can be positioned in photosensitive element 26 between support 10 thereof and cyan dye developer layer 11, neutralizing layer 23 being adjacent support 10.

Figure 2:
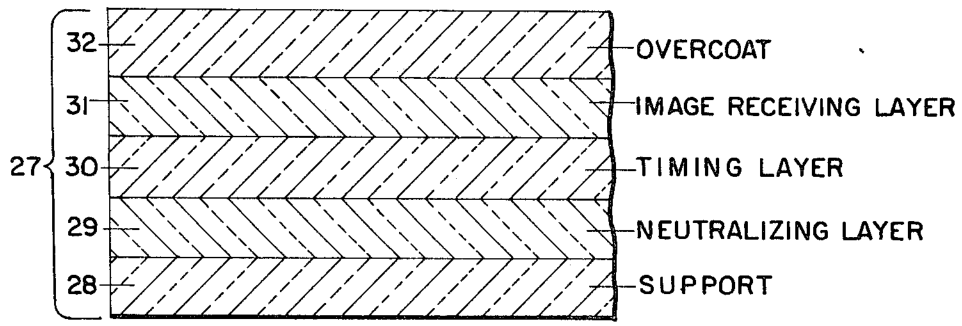
FIG. 2 is a cross-sectional view of an image-receiving element including a diffusion control timing layer of this invention.

The image-receiving element 27 illustrated in FIG. 2 comprises in order, a support layer 28, a neutralizing layer 29, a spacer or timing layer 30, an image-receiving layer 31 and an overcoat 32. During processing the image-receiving element overcoat is situated closest to the photosensitive element. In one embodiment of this invention, a diffusion control layer comprising a $\beta$-elimination polymeric material in accordance with this invention comprises overcoat layer 32.

A measure of time of pH reduction can be had from a quantity which can be referred to as a "clearing time" which can be measured by use of the following system. An image-receiving element comprising in order on a support, a polymeric acid layer, a test timing layer and a mordanting layer, is spread with an alkaline processing material of high pH comprising an indicator dye which is highly colored at pH's of about 12 to 14 and colorless below about 10. A transparent cover sheet is superposed the processing material. The view through the cover sheet toward the image-receiving element is dark until the alkali has penetrated to the polymeric acid layer where the pH is reduced by alkali consumption and the indicator dye becomes colorless, the system has "cleared". A skilled operator can determine when the clearing begins and when it is complete. A "leaky" timing layer allows a trickle of alkali through from the moment of first contact and shows no precipitous change in beginning to clear nor in the final clearing. A timing layer comprising the polymers of the instant invention will hold the alkali back for a definite timed period, and then, over a very short time interval, allow sufficient alkali through to drop the pH below the transition range of the indicator dye.

Clearing time can be measured for a structure that comprises an entire image-receiving element or it can be measured for a model simplified structure that includes only the timing layer coated over the polymeric acid layer on the support. The first clearing time is referred to as "clearing through the mordant" while the second model structure clearing is referred to as "clearing through the timing layer".

The diffusion control layer of this invention used as a top coat for an image-receiving element is located on top of the strata that comprise the image-receiving element. For example, in an image-receiving element comprising in order, a support, a polymeric acid layer, a spacer layer and an alkali permeable and dyeable polymeric layer, the diffusion control layer is located next adjacent the alkali permeable and dyeable polymeric layer, furthest from the support and acts to delay permeation to the image-receiving element of the processing composition and materials solubilized by it.

The capacity of polymeric diffusion control layers of the invention to delay permeation therethrough of image-forming dye until conversion by a $\beta$-elimination reaction to a relatively dye-permeable polymer can be evaluated by resort to utilization of a test structure shown in FIG. 3. In accordance with such structure, dye transfer through the polymeric test material, e.g., an interlayer test material, is monitored in relation to time. The "hold-release" properties of a polymeric test material can be evaluated in simulation of the functioning of a material as, e.g., an interlayer in a photosensitive element. Such test structure and a suitable method of evaluation are set forth in detail in Examples 1 to 15 hereof.

The following examples are presented for illustrative purposes only and are not intended to be in any way limiting. Measurements were made at ambient room temperature, about 25° C., unless otherwise specified.

EXAMPLES 1-10

On a transparent support, 33 in FIG. 3, a layer 34 comprising 20 mg/ft$^2$ of a cyan dye developer

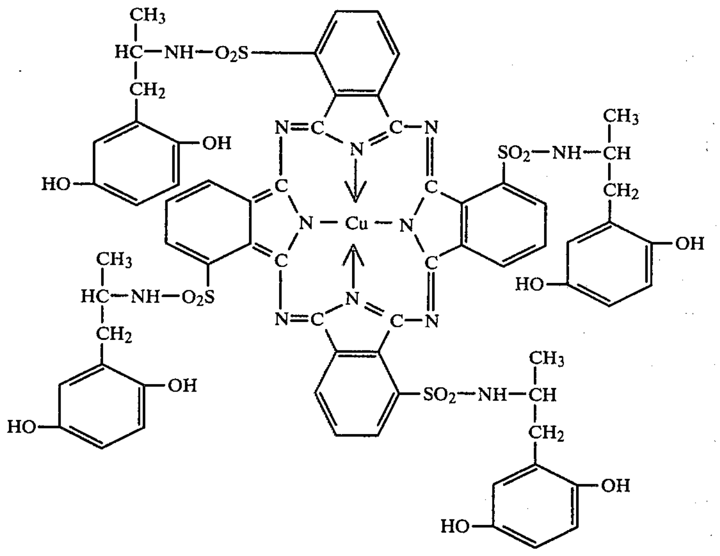

40 mg/ft² gelatin and 1.5 mg/ft² of succinaldehyde was coated using a conventional loop coated. Over this layer, a layer 35 containing 200 mg/ft² of the polymeric material being tested was coated.

A transparent element 38 comprising a polyester clear film base was superposed with test elements to form sandwiches and an opaque alkaline processing composition

| 36 comprising: | | |
|---|---|---|
| Potassium hydroxide (45% aqueous solution) | 22.9 | g. |
| Lithium hydroxide | 0.55 | g. |
| Benzotriazole | 1.53 | g. |
| 6-Bromo-5-methyl-4-azabenzimidazole | 0.08 | g. |
| 6-methyl uracil | 0.82 | g. |
| Ethylene diamine tetraacetic acid | 2.27 | g. |
| Bis-(2-aminoethyl) sulfide | 0.06 | g. |
| Carbowax (mw 6000) | 1.5 | g. |
| Colloidal silica | 5.05 | g. |
| 6-benzylaminopurine | 1.09 | g. |
| Titanium dioxide | 115.23 | g. |
| N—phenethyl α-picolinium bromide (50% aqueous solution) | 3.91 | g. |
| N—benzyl α-picolinium bromide (50% aqueous solution) | 5.09 | g. |
| Lithium nitrate | 0.27 | g. |
| Carboxymethyl hydroxyethyl cellulose | 4.82 | g. |
| Water | 100 | g. |

was introduced between the polymeric test material layer and the transparent element 38 at a gap of 0.0028 in.

Figure 4:
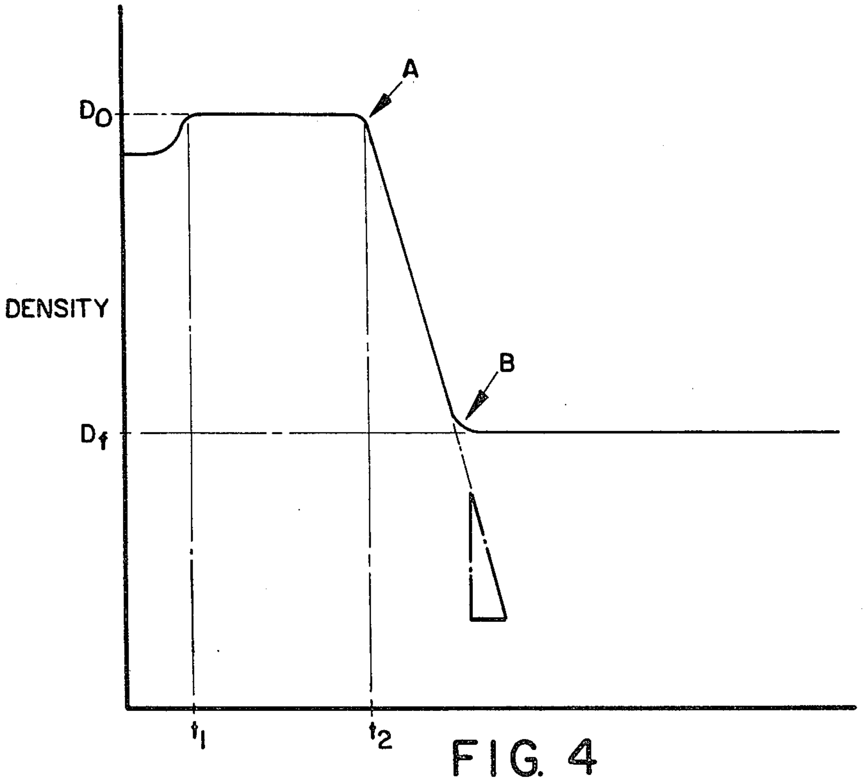
FIG. 4 is a graphical depiction of dye density as a function of time in a system including an interlayer of the present invention.

The optical reflection density to red light of the processed sample, viewed through support 33 in FIG. 3, as a function of time was continuously read using a MacBeth Quanta-Log densitometer equipped with a Hewlett-Packard 17505A strip-chart recorder. This density comprises contributions from the dye image-forming material remaining in the dye layer and dye image-forming material in the polymeric test layer. The titanium dioxide in the processing composition masks dye image-forming material in the processing composition layer. A typical curve of density as a function of time is given in FIG. 4 wherein $t_1$ is the time for dye image-forming material to solubilize, $t_2$ is the total time the dye image-forming material is held back by the polymeric interlayer, $D_o$ is the density after the initial dissolution of the dye image-forming material, $D_f$ is the density after dye transfer through the interlayer, and the slope of the line segment between A and B is calculated as the rate of change of density.

Values for $t_1$, $t_2$ and slope are given below for the following hold-release polymer systems of the present invention:

| | | |
|---|---|---|
| 1. | 100 | parts by weight of 2-cyanoethyl acrylate mixed with |
| | 100 | parts by weight of a 95.5/4.5 copolymer of diacetone acrylamide and acrylic acid and polymerized. |
| 2. | 35 | parts by weight of 2-cyanoethyl acrylate mixed with |
| | 65 | parts by weight of a 95.5/4.5 copolymer of diacetone acrylamide and acrylic acid and polymerized. |
| 3. | | A 47.5/50/2.5 interpolymer of diacetone acrylamide, 2-cyanoethyl acrylate and acrylic acid. |
| 4. | | A 63/35/2 interpolymer of diacetone acrylamide, 2-cyanoethyl acrylate and acrylic acid |
| 5. | | An 85/10/2/3 interpolymer of butylacrylate, 2-cyanoethyl acrylate, methacrylic acid and 2-acrylamido-2-methyl propane sulfonic acid. |
| 6. | | An 85/10/2/3 interpolymer of butyl acrylate, 2-cyanoethyl acrylate, methacrylic acid and 2-sulfoethylmethacrylate. |
| 7. | 35 | parts by weight of 2-cyanoethylacrylate mixed with |
| | 100 | parts by weight of a 99.25/0.75 copolymer of 2-cyanoethylacrylamide and acrylic acid and polymerized. |
| 8. | | A 63/35/2 interpolymer of diacetone-acrylamide, 2-carbethoxyethyl methacrylate and acrylic acid. |
| 9. | | A 63/35/2 interpolymer of diacetone acrylamide, 2-cyanoethyl methacrylate and acrylic acid. |
| 10. | 100 | parts by weight of 94/6 copolymer of diacetone acrylamide and acrylic acid mixed with |
| | 100 | parts by weight of a 63/35/2 interpolymer of diacetone acrylamide, 2-cyanoethyl methacrylate and acrylic acid. |

All interpolymer constituent proportions are on a weight basis

| Sample | $t_1$ | $t_2$ | slope |
|---|---|---|---|
| 1 | 2 | 26 | 404 |
| 2 | 3 | 22 | 522 |
| 3 | 5 | 15 | 280 |
| 4 | 5 | 15 | 580 |
| 5 | 0 | 11 | 675 |
| 6 | 10 | 16.5 | 737 |
| 7 | 0 | 28 | 250 |
| 8 | 0 | 12 | 200 |
| 9 | 7 | 14 | 870 |
| 10 | 1 | 18 | 525 |

It is apparent from the foregoing table that the present invention provides a significant hold time before solubilized dye image forming material is released, and accomplishes the dye release in a relatively short time span.

Hold time is longer at 45° F. and shorter at 95° F., paralleling development time. For example, sample 2 above has a $t_2$ of 215 sec. at 45° F. and a slope of 87, and has a $t_2$ of 11 sec. at 95° F. and a slope of 654.

EXAMPLES 11-15

Test elements were prepared as in example 1-10. A second transparent element comprising a polyester clear film base was superposed to the test elements to form sandwiches and an opaque alkaline processing composition comprising:

| | | |
|---|---|---|
| Potassium hydroxide (45% aqueous solution) | 13.63 | g. |
| Cesium hydroxide (50% aqueous solution) | 10.65 | g. |
| Benzotriazole | 1.18 | g. |
| 5-hydroxyazabenzimidazole | 0.118 | g. |
| 6-bromo-5-methyl-4-azabenzimidazole | 0.059 | g. |
| 2-methylimidazole | 0.42 | g. |
| Sodium carboxymethyl cellulose | 4.43 | g. |
| Titanium dioxide | 59.27 | g. |
| N—phenethyl-α-picolinium bromide (50% aqueous solution) | 4.2 | g. |
| Water | 100 | g. |

was introduced between the polymeric material and the uppermost transparent element at a gap of 0.0028 in.

The time, τ, needed for the dye material to permeate the polymeric material was determined by monitoring optical density of the dye through the uppermost transparent element using the densitometer designated in Examples 1-10.

Values for τ in seconds are given below for the following hold-release polymer systems of the present invention:

| | |
|---|---|
| 11. | 2 parts by weight of an 85/10/3/2 interpolymer of butyl acrylate, 2-cyanoethyl acrylate, 2-sulfoethyl methacrylate with 1 part by weight of a 94/6 copolymer of butyl acrylate and acrylic acid. |
| 12. | An 85/10/2/3 interpolymer of butyl acrylate, 2-cyanoethyl acrylate, methacrylic acid and 2-acrylamido-2-methylpropane sulfonic acid. |
| 13. | An 89/6/2/3 interpolymer of butyl acrylate, 2-cyanoethyl acrylate, methacrylic acid and 2-sulfoethyl-methacrylate. |
| 14. | 85 parts of an 68/10/2/5 interpolymer of butyl acrylate, 2-cyanoethyl methacrylate, 2-sulfoethylmethacrylate and ethyleneglycol dimethacrylate to which 15 parts by weight of butyl acrylate is added and polymerized. |
| 15. | An 85/10/2/3 interpolymer of butyl acrylate, 2-cyanoethylacrylate, methacrylic acid and 2-sulfoethyl methacrylate. |

| Sample | τ |
|---|---|
| 11 | 70 |
| 12 | 30 |
| 13 | 12 |
| 14 | 10 |
| 15 | 120 |

τ, while measuring the time before solubilized dye image forming material becomes available to an image receiving layer, includes the time necessary for this solubilized dye image forming material to diffuse through the alkaline processing composition and has a component related to the thickness of that alkaline processing composition layer.

The relative proportions of ingredients in the processing composition may naturally be altered where desired. For example, substitution of various preservatives, alkalies, silver halide solvents, etc. is contemplated, as well as inclusion of such components as restrainers and accelerators. The concentration of various components may also be varied over a wide range.

EXAMPLES 16-19

Image-receiving elements of the invention were prepared by coating a transparent 4 mil polyethylene terephthalate film base with the following layers to form an image-receiving component:

1. as a polymeric acid layer, the partial butyl ester of polyethylene/maleic anhydride copolymer mixed with about 10% by weight of polyvinyl butyral and coated at a coverage of about 2500 mg/ft$^2$;
2. a timing layer containing polymeric materials described in detail in the examples that follow; and
3. as a polymeric image-receiving layer a mixture of 6 parts by weight of polyvinyl alcohol, 3 parts by weight of poly-4-vinylpyridine and 1 part by weight of a graft polymer of 4-vinyl pyridine-vinylbenzyltri-methyl ammonium chloride on hydroxy-ethylcellulose at a coverage of 300 mg/ft$^2$. The elements are labeled (a).

For comparison, test elements were prepared which did not have the polymeric image-receiving layer on top of the timing layers. These elements are labeled (b).

| | Timing Layer | | Permeation Time (sec) | |
|---|---|---|---|---|
| Example | Material | Coverage mg/ft$^2$ | Start | Finish |
| Control (a) | I | 500 | 180 | 210 |
| (b) | I | 500 | 60 | 87 |
| 16(a) | II | 250 | 215 | 245 |
| 16(b) | II | 250 | 60 | 68 |
| 17(a) | II | 500 | 280 | 325 |
| 17(b) | II | 500 | 92 | 105 |
| 18(a) | III | 500 | 33 | 40 |
| 18(b) | III | 500 | 25 | 29 |
| 19(a) | III | 250 | 25 | 32 |
| 19(b) | III | 250 | 15 | 20 |

where I is a 60/30/4/6 interpolymer of butyl acrylate, diacetone acrylamide, styrene and methacrylic acid blended with 9% by weight of polyvinylalcohol; II is a polymeric material comprising 100 parts of a 87.5/2/0.5 interpolymer of diacetone acrylamide, acrylic acid and 2-acrylamido-2-methyl propane sulfonic acid, sodium salt to which is added and polymerized 49 parts of 2-cyanoethyl acrylate; and III is a 63/35/2 interpolymer of diacetone acrylamide, 2-cyanoethyl acrylate and acrylic acid.

| | |
|---|---|
| 100 g | water |
| 4.02 g | hydroxyethyl carboxymethyl cellulose |
| 4.15 g | 50% potassium hydroxide solution |
| 1.12 g | benzotriazole |
| 0.50 g | thymolphthalein |

was introduced between the polymeric test material layer and the transparent element at a gap of 0.0028 in. The time denoted as permeation time and measured in seconds, for the sandwich to change color from blue to colorless is a measure of the time necessary for the processing composition to permeate the timing layer and react with the polymeric acid layer lowering the pH. Times are recorded as "start", when the sandwich first starts to clear and "finish" when the sandwich has substantially completed clearing.

EXAMPLES 20-27

On a transparent 4 mil polyethylene terephthalate film base was coated and partial butyl ester of polyethylene/maleic anhydride copolymer mixed with about 10% by weight of polyvinyl butyral at a coverage of about 2500 mg/ft$^2$. On this layer was coated the following timing layers and image receiving layers at the coverages indicated. Permeation time was measured as detailed above.

| Example | Timing Layer | | Image Receiving Layer | | Permeation Time (sec) | |
|---|---|---|---|---|---|---|
| | Material | Coverage mg/ft$^2$ | Material | Coverage mg/ft$^2$ | Start | Finish |
| 20 | A | 200 | — | — | | 31 |
| 21 | A | 200 | D | 500 | 54 | 58 |
| 22 | B | 200 | — | — | | 31 |
| 23 | B | 200 | D | 500 | | 62 |
| 24 | C | 600 | — | — | 41 | 48 |
| 25 | C | 1000 | — | — | 41 | 48 |
| 26 | C | 600 | D | 500 | 80 | 92 |
| 27 | C | 1000 | D | 500 | 80 | 110 |

where A is a polymeric material comprising a 56.7/25/5/1/2 interpolymer of butylacrylate, 2-cyanoethylacrylate, ethylene glycol dimethacrylate, acrylic acid and styrene to which is added and polymerized a 10/3 mixture of diacetone acrylamide and acrylic acid. The pH of A is 2.6; B comprises the material of A with sufficient potassium hydroxide added to bring the pH to 8.0; C is 59/40/1 interpolymer of diacetone acrylamide, 2-cyanoethylacrylate and acrylic acid; and D is a graft copolymer of 4-vinyl pyridine, vinyl benzyl trimethyl ammonium chloride on polyvinyl alcohol.

EXAMPLE 28

This Example illustrates the preparation of a preferred matrix/β-elimination polymeric material useful as a diffusion control layer of the invention.

A polymeric material comprised of 70 parts by weight of a matrix copolymer (comprising 50.5 parts by weight of diacetone acrylamide; 44.0 parts by weight of butyl acrylate; 5.0 parts by weight of acrylic acid; and 0.5 part by weight of 2-acrylamido-2-methylpropane sulfonic acid) and 30 parts by weight of a β-eliminating copolymer (comprising 71.72 parts by weight of β-cyanoethylacrylate and 28.28 parts by weight of diacetone acrylamide) was prepared in the following manner:

A glass reaction vessel was charged with 2155.4 mls. of water; 0.027 gram ferrous sulfate heptahydrate; 20.59 grams of a 20.4% by weight dialyzed solution of Dowfax emulsifier (available from Dow Chemical Company, Midland, Mich.); and 5.6 grams of Triton X-100 emulsifier (available from Rohn and Haas Corporation, Philadelphia, Pa.). Nitrogen purging of the reaction components was commenced and continued throughout the subsequent polymerization. The reactor mixture was heated to 90° C. over a period of about 30 minutes before the following separate streams of reaction components were added simultaneously over a period of two hours to the reactor mixture:

(1) a mixture prepared by adding 616 grams of butyl acrylate to a mixture of 707 grams diacetone acrylamide, 70.0 grams acrylic acid, 7.0 grams 2-acrylamido-2-methylpropane sulfonic acid, 27.45 grams of a 20.4% by weight dialyzed solution of Dowfax emulsifier and 1400 mls. of water and forming a homogeneous emulsion therefrom in a blender;

(2) a solution of 5.094 grams potassium persulfate in 300 grams of water; and (3) a solution of 1.923 grams sodium bisulfite in 300 grams of water.

Upon completion of the addition to the reaction vessel of the three aforesaid streams, the resulting emulsion polymer was maintained for one hour at 90° C. with stirring. The temperature was then lowered to 50° C., whereupon, there was added over a 30-minute period 91.07 grams of 2 Normal triethanolamine to raise the pH of the reaction mixture to about 6.2. To the resulting polymeric reaction product were added, at a temperature of 50° C. and over a 90-minute period, the following separate streams of reaction components:

(1) diacetone acrylamide (169.7 grams) to which had been added with mixing 430.3 grams of β-cyanoethyl acrylate;

(2) a solution of 1.986 grams potassium persulfate in 225 grams of water; and (3) a solution of 1.209 grams sodium bisulfite in 225 grams of water.

Upon completion of the additions to the reaction vessel of the three immediately aforesaid streams, the resulting reaction mixture was maintained with stirring at a temperature of 50° C. for three hours. The reaction mixture was allowed, over a one-hour period under conditions of ambient room temperature and stirring, to cool to a temperature of 40° C. and the resulting polymeric product was filtered. Yield was 6760 grams of product having a solids content of 30.36% by weight.

EXAMPLE 29

For purposes of comparison with the matrix polymerization described in Example 28, an interpolymer prepared by a single-step polymerization of the same reactive monomers in the same relative proportions as described in Example 28 was conducted. The resulting polymer was an interpolymer of 43.83 parts diacetone acrylamide; 3.5 parts acrylic acid; 0.35 part 2-acrylamido-2-methylpropane sulfonic acid; 30.8 parts butyl acrylate; and 21.52 parts β-cyanoethyl acrylate. The polymerization was conducted in the following manner.

A glass reaction vessel was charged with 2155.4 mls. of water; 0.027 grams ferrous sulfate heptahydrate; 20.59 grams of a 20.4% by weight dialyzed solution of Dowfax emulsifier (available from Dow Chemical Company, Midland, Mich.); and 5.6 grams of Triton X-100 emulsifier (available from Rohm and Haas Corporation, Philadelphia, Pa.). Nitrogen purging of the reactor components was commenced and continued throughout the subsequent polymerization. The reactor mixture was heated to 90° C. over a period of about 30 minutes before the following separate streams of reaction components were added simultaneously over a periof of two hours to the reactor mixture:

(1) a mixture prepared by combining 876.7 grams diacetone acrylamide, 70 grams acrylic acid, 7.0 grams 2-acrylamido-2-methylpropane sulfonic acid, 430.3 grams β-cyanoethyl acrylate, 616 grams butyl acrylate, 27.45 grams of a 20.4% by weight dialyzed solution of Dowfax emulsifier and 1400 mls. of water and mixing in a blender to a homogeneous emulsion;

(2) a solution of 7.08 grams potassium persulfate in 525 grams of water; and (3) a solution of 3.132 grams sodium bisulfite in 525 grams of water.

Upon completion of the addition to the reaction vessel of the three aforesaid streams, the reaction vessel was maintained while stirring at a temperature of 90° C. for three hours. The polymeric reaction product was allowed, over a one-hour period under conditions of ambient room temperature and stirring, to cool to a temperature of 40° C. and the resulting polymeric product was filtered. Yield was approximately 6600 grams of product having a solids content of 30.3% by weight.

EXAMPLE 30

The polymeric materials obtained in the manner set forth in Examples 28 and 29 were evaluated for "hold-release" properties in the manner described in connection with the evaluation of the polymeric materials of Examples 1 to 11 hereof, except that an aqueous processing composition having the following composition was utilized in lieu of the processing composition described therein:

| | |
|---|---|
| Potassium hydroxide (45% aqueous solution) | 23.94 g. |
| Benzotriazole | 1.33 g. |
| 6-Methyl uracil | 0.73 g. |
| Bis-(β-aminoethyl)-sulfide | 0.06 g. |
| Colloidal silica, aqueous dispersion ($30\%\ SiO_2$) | 4.48 g. |
| Titanium dioxide | 92.12 g. |
| N—phenethyl-α-picolinium bromide (50% aqueous solution) | 6.18 g. |
| N—2-hydroxyethyl-N,N'N'—triscarboyxmethyl ethylene diamine | 1.82 g. |
| 4-Amino pyrazolo(3,4d)pyrimidine | 0.61 g. |
| Carboxymethyl hydroxyethyl cellulose | 4.82 g. |
| Water | 100 g. |

The following results were obtained:

| | $t_1$ (seconds) | $t_2$ (seconds) | Slope |
|---|---|---|---|
| Example 28 | 1.8 | 15 | 918 |
| Example 29 | 4.8 | 30 | 42 |

As can be seen from inspection of the preceding data, the polymeric interlayer materials of each of Examples 28 and 29 exhibited appreciable "hold" of dye developer. The "release" was, in the case of the matrix/β-elimination polymer material of Example 28, decidedly more rapid as indicated by the higher slope.

Since substitution and changes can be made in the above described products and processes without departing from the scope of the invention, it is intended that all matter in the foregoing description shall be interpreted as illustrative and not in a limiting sense.

What is claimed is:

1. A polymeric product adapted to utilization in a diffusion control layer, comprising a preformed aqueous emulsion polymer matrix material comprising recurring units from diacetone acrylamide, butylacrylate and acrylic acid, said matrix material having polymerized therein a polymer of a mixture of a β-elimination monomer capable of undergoing β-elimination in an alkaline environment and a copolymerizable ethylenically-unsaturated comonomer, said product having been obtained by polymerizing said β-elimination monomer and said copolymerizable ethylenically-unsaturated comonomer in the presence of said preformed emulsion polymer matrix, said β-elimination monomer having the formula

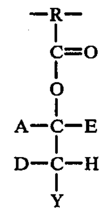

wherein R is an ethylenically unsaturated group of two or three carbon atoms; A, D and E are selected from the group consisting of hydrogen, methyl and phenyl provided that no more than one of A, E or D may be methyl or phenyl; and Y is an activating group which activates said β-elimination.

2. The polymeric product of claim 1 wherein said mixture of β-elimination monomer and copolymerizable ethylenically-unsaturated comonomer comprises a mixture of 2-cyanoethyl acrylate and diacetone acrylamide.

3. A process for preparing a polymeric product adapted to utilization in a diffusion control layer which comprises preparing a preformed aqueous emulsion polymer matrix by the aqueous emulsion polymerization of a mixture of copolymerizable ethylenically-unsaturated monomers comprising diacetone acrylamide, butylacrylate and acrylic acid; upon substantial completion of said polymerization, introducing to said preformed aqueous emulsion polymer matrix a mixture of a β-elimination monomer capable of undergoing β-elimination in an alkaline environment and a copolymerizable ethylenically-unsaturated comonomer; and conducting the polymerization of said mixture of β-elimination monomer and copolymerizable ethylenically-unsaturated comonomer in the presence of said preformed aqueous emulsion polymer matrix; said β-elimination monomer having the formula

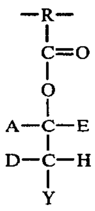

wherein R is an ethylenically-unsaturated group of two or three carbon atoms; A, D and E are selected from the group consisting of hydrogen, methyl and phenyl provided that no more than one of A, E or D may be methyl or phenyl; and Y is an activating group which activates said β-elimination.

4. The process of claim 3 wherein said mixture of β-elimination monomer and copolymerizable ethylenically-unsaturated comonomer comprises a mixture of 2-cyano-ethyl acrylate and diacetone acrylamide.

5. The polymeric product of claim 1 wherein said activating group is selected from the group consisting of $—SO_2W$,

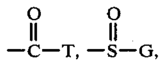

and —CN where W is $C_6H_5CH_3$, $—CH_3$, $—OC_2H_3$, $—C_6H_5$, $—NR_2$, $—N(CH_2C_6H_5)_2$; T is $—OC_2H_5$, $—CH_3$, —H, $—NH_2$, $—NR_2$; G is phenyl, methyl or ethyl and R is alkyl.

6. The process of claim 3 wherein said activating group is selected from the group consisting of $—SO_2W$,

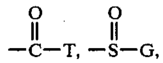

and —CN where W is $C_6H_5CH_3$, $—CH_3$, $—OC_2H_3$, $—C_6H_5$, $—NR_2$, $—N(CH_2C_6H_5)_2$; T is $—OC_2H_5$, $—CH_3$, —H, $—NH_2$, $—NR_2$; G is phenyl, methyl or ethyl and R is alkyl.

* * * * *